US005424362A

United States Patent [19]
Hwang et al.

[11] Patent Number: 5,424,362
[45] Date of Patent: Jun. 13, 1995

[54] PAINTABLE OLEFINIC INTERPOLYMER COMPOSITIONS

[75] Inventors: Yuh-Chin Hwang, Lake Jackson; Thomas J. McKeand, Jr., Clute; Stephen R. Betso, Lake Jackson, all of Tex.; H. Craig Silvis, Midland, Mich.; Deepak R. Parikh; Don J. Germano, both of Lake Jackson, Tex.

[73] Assignee: The Dow Chemical Company, Midland, Mich.

[21] Appl. No.: 54,384

[22] Filed: Apr. 28, 1993

[51] Int. Cl.⁶ ............................................. C08L 51/06
[52] U.S. Cl. ........................................ 525/71; 525/74; 525/78; 525/80; 525/57; 525/221; 428/523
[58] Field of Search .................. 525/74, 71, 77, 78, 525/221, 240, 285, 80; 526/348.5

[56] References Cited

U.S. PATENT DOCUMENTS

| | | | |
|---|---|---|---|
| 3,236,917 | 2/1966 | Natta et al. | 260/878 |
| 4,678,834 | 7/1987 | Boivin et al. | 525/74 |
| 4,762,882 | 8/1988 | Okano et al. | 525/78 |
| 4,888,391 | 12/1989 | Domine et al. | 525/221 |
| 4,916,208 | 4/1990 | Klingensmith | 528/392 |
| 4,945,005 | 7/1990 | Aleckner, Jr. et al. | 428/500 |
| 4,946,896 | 8/1990 | Mitsuno et al. | 525/93 |
| 4,950,541 | 8/1990 | Tabor et al. | 428/373 |
| 4,997,720 | 3/1991 | Bourbonais et al. | 428/500 |
| 5,089,321 | 2/1992 | Chum et al. | 428/218 |
| 5,115,033 | 5/1992 | Wong | 525/285 |
| 5,194,509 | 3/1993 | Hasenbein et al. | 525/285 |
| 5,272,236 | 12/1993 | Lai et al. | 526/348.5 |
| 5,278,272 | 1/1994 | Shih-Yaw Lai | 526/348.5 |

FOREIGN PATENT DOCUMENTS

0243206A2 10/1987 European Pat. Off. .
0508415A2 10/1992 European Pat. Off. .

*Primary Examiner*—James J. Seidleck
*Assistant Examiner*—M. L. Warzel

[57] ABSTRACT

Paintable thermoplastic polyolefin compositions are disclosed which comprise (i) 30 to about 70 wt % of at least one polypropylene or graft-modified polypropylene, (ii) 0 to about 40 wt % of at least one nongrafted or graft-modified substantially linear ethylene polymer, and (iii) 0 to about 50 wt % of an interpolymer of ethylene and an $\alpha,\beta$-unsaturated carbonyl copolymer, e.g. a copolymer of ethylene and acrylic acid. The polypropylene and substantially linear ethylene polymer are grafted with an unsaturated organic compound containing at least on ethylenic unsaturation and at least one carbonyl group, e.g. maleic anhydride. The compositions exhibit excellent paintability with conventional paints without prior application of a primer or surface treatment, good heat resistance, and good low temperature impact resistance and they can be recycled by melt blending the compositions with thermoplastic materials, e.g., in an extruder.

21 Claims, No Drawings

PAINTABLE OLEFINIC INTERPOLYMER COMPOSITIONS

BACKGROUND OF THE INVENTION

This invention relates to paintable compositions. In one aspect, the invention relates to paintable compositions comprising polypropylene and at least one of (i) a substantially linear ethylene polymer, or (ii) an interpolymer of ethylene and an $\alpha,\beta$-unsaturated carbonyl. In another aspect, the invention relates to paintable compositions in which one or both of the polypropylene and substantially linear ethylene polymer are grafted with an unsaturated organic compound containing a carbonyl group, e.g. maleic anhydride. In yet another aspect, the invention relates to articles fabricated from these paintable compositions.

Thermoplastic polyolefins (TPOs) have many desirable properties, e.g. light weight, durability, low cost, etc., that make them an attractive material of construction for many consumer goods, e.g. interior and exterior automotive parts, decorative fascia for household appliances, and the like. However because of their nonpolar nature, TPOs do not readily accept paint or decorative print. Most paints and inks are polar in nature, and thus require a surface with some degree of polarity before it can adhere to the surface with any degree of desirable fastness.

In the past, this problem has been addressed from a number of different directions. One typical and effective method of applying a paint to a TPO is first to apply a primer to the TPO. Primer materials are typically compositions containing a halogenated polyolefin and an aromatic solvent and while widely recognized as effective, primers are expensive and their application is an extra step in the finishing of the TPO article.

Another effective approach is to subject the surface of a TPO article to a physical or chemical treatment, such as etching with a chemical abrasive or irradiating with a plasma. While generally effective, these methods are more complex in nature than the application of a primer, and thus more difficult to control in terms of quality and consistency from part to part.

Another approach is to modify the physical and/or chemical properties of the TPO either by blending it with other thermoplastic polymers, or by incorporating into it one or more polar groups, or both. For example, U.S. Pat. No. 4,946,896 to Mitsuno, et al. teaches a paintable TPO comprising 20–80 weight percent (wt %) polypropylene; 5–38 wt % of an ethylene copolymer consisting of ethylene, an ester unit of either alkyl acrylate or methacrylate, and an unsaturated dicarboxylic acid anhydride; and 5–70 wt % ethylene-propylene rubber. U.S. Pat. No. 4,888,391 to Domine, et al. teaches a paintable polyolefin composition comprising a blend of a polyolefin as the continuous phase with an ethylene/acrylate/acrylic acid terpolymer as the discontinuous phase. U.S. Pat. No. 4,945,005 to Aleckner, Jr., et al. teaches paintable TPOs comprising 2–25 wt % of a copolymer of an ethylenically unsaturated carboxylic acid and ethylene; 3–50 wt % of an ethylene α-olefin copolymer; optionally a crystalline homopolymer or copolymer of propylene; 5–50 wt % of an inorganic filler; and 10–35 wt % of a polyethylene or a copolymer of ethylene and an α-olefin. Co-pending U.S. Ser. No. 07/893,875 filed Jun. 5, 1992 teaches a paintable polyethylene comprising at least 50 wt % polyethylene grafted with at least about 0.01 wt %, based on the weight of the polyethylene, of an unsaturated organic compound containing at least one double bond and at least one functional acid group, e.g. maleic anhydride, and at least one thermoplastic polymer containing polar groups, e.g. polyurethane. Each of these disclosures are incorporated herein by reference.

While these and other modified TPO compositions all demonstrate some degree of efficacy, a continuing interest exists in identifying and developing new paintable TPOs.

SUMMARY OF THE INVENTION

According to this invention, a paintable, thermoplastic polyolefin composition comprises, in weight percent (wt %), based upon the total weight of the composition, about:

A. 30 to about 70 percent of at least one of polypropylene or graft-modified polypropylene;

B. 0 to about 40 percent of at least one of a nongrafted substantially linear ethylene polymer or graft-modified substantially linear ethylene polymer; and C. 0 to about 50 percent of an interpolymer of ethylene and an $\alpha,\beta$-unsaturated carbonyl;

with the provisos that:

(i) the sum of Components B and C is between about 30 and about 70 wt % of the composition, and (ii) the substantially linear ethylene polymer is characterized as having:

(a) a melt flow ratio, $I_{10}/I_2 \geq 5.63$;

(b) a molecular weight distribution, $M_w/M_n$, defined by the equation:

$$M_w/M_n \leq (I_{10}/I_2) - 4.63; \text{ and}$$

(c) a density greater than about 0.850 g/cm$^3$.

(d) a critical shear rate at onset of surface melt fracture of at least 50 percent greater than the critical shear rate at the onset of surface melt fracture of a linear olefin polymer having about the same $I_2$ amd $M_w/M_n$.

Component A of the paintable TPO composition of this invention can comprise 100 wt % polypropylene, or 100 wt % graft-modified polypropylene, or a blend of the two in any proportion. Similarly, Component B of the paintable TPO composition can comprise 100 wt % of the substantially linear ethylene polymer, or 100 wt % of the graft-modified version of this polymer, or a blend of the two in any proportion. As here used, "graft-modified" means that the polypropylene or the substantially linear ethylene polymer is grafted with an unsaturated organic compound containing at least one ethylenic unsaturation and at least one carbonyl group.

DESCRIPTION OF THE PREFERRED EMBODIMENTS

The polypropylene component of this invention is a homopolymer or one or more copolymers of propylene and up to about 20 mole percent ethylene or other α-olefin having up to about 12 carbon atoms. If a copolymer, it can be random, block or graft. The polypropylene component of this invention has a typical melt flow rate (as determined by ASTM D-1238, Condition 230/2.16 (formerly Condition L)) of between about 0.1 and 30, and preferably between about 0.8 and 30.

The substantially linear ethylene polymers used in the practice of this invention are known, and they and their method of preparation are fully described in U.S. Pat.

No. 5,272,236 and U.S. Pat. No. 5,278,272 both of which are incorporated herein by reference. As here used, "substantially linear" means that the polymer backbone is substituted with about 0.01 long-chain branches/1000 carbons to about 3 long-chain branches/1000 carbons, more preferably from about 0.01 long chain branches/1000 carbons to about 1 long-chain branch/1000 carbons, and especially from about 0.05 long-chain branches to about 1 long-chain branch/1000 carbons. Long-chain branching is here defined as a chain length of at least about 6 carbon atoms, above which the length cannot be distinguished using $^{13}C$ nuclear magnetic resonance spectroscopy, yet the long-chain branch can be about the same length as the length of the polymer backbone.

These unique polymers (subsequently referred to as "substantially linear ethylene polymers") are prepared by using constrained geometry catalysts (CGC), and are characterized by a narrow molecular weight distribution. Other basic characteristics of these substantially linear ethylene polymers include a low residuals content (i.e. low concentrations in the substantially linear ethylene polymer of the catalyst used to prepare the polymer, unreacted comonomers, and low molecular weight oligomers made during the course of the copolymerization), a narrow comonomer distribution with respect to substantially linear ethylene interpolymers, and a controlled molecular architecture which provides good processability even though the molecular weight distribution is narrow relative to conventional olefin polymers.

While the substantially linear ethylene polymers used in the practice of this invention include substantially linear ethylene homopolymers, preferably these substantially linear ethylene polymers comprise between about 95 and 50 wt % ethylene, and about 5 and 50 wt % of at least one α-olefin comonomer, more preferably 10 to 25 wt % of at least one α-olefin comonomer. Comonomer content may be determined using infrared spectroscopy according to ASTMD-2238 Method B. Typically, the substantially linear ethylene polymers are copolymers of ethylene and an α-olefin of 3 to about 20 carbon atoms (e.g. propylene, 1-butene, 1-hexene, 4-methyl-1-pentene, 1-heptene, 1-octene, styrene, etc.), preferably of 3 to about 10 carbon atoms, and most preferably these polymers comprise ethylene and 1-octene. The density of the substantially linear ethylene polymer is typically between about 0.850 and about 0.96 grams per cubic centimeter (g/cm$^3$), preferably between about 0.855 and about 0.92 g/cm$^3$, and more preferably between about 0.865 and about 0.90 g/cm$^3$, and even more preferably between about 0.865 and about 0.88 g/cm$^3$. The melt flow ratio, measured as $I_{10}/I_2$ (ASTM D-1238), is greater than or equal to 5.63, and is preferably from about 6.5 to 15, more preferably from about 7 to 10. The molecular weight distribution ($M_w/M_n$), measured by gel permeation chromatography (GPC), is defined by the equation:

$$M_w/M_n \leq (I_{10}/I_2) - 4.63,$$

and is preferably between about 1.8 and 2.5. For these substantially linear ethylene polymers, the $I_{10}/I_2$ ratio indicates the degree of long-chain branching, i.e. the larger the $I_{10}/I_2$ ratio, the more long-chain branching in the polymer.

The unique characteristic of the homogeneously branched, substantially linear ethylene polymers is a highly unexpected flow property where the $I_{10}/I_2$ value of the polymer is essentially independent of the polydispersity index (i.e., $M_w/M_n$) of the polymer. This is contrasted with conventional linear homogeneously branched and heterogeneously branched polyethylene resins having rheological properties such that to increase the $I_{10}/I_2$ value the polydispersity index must also be increased.

Substantialy linear olefin polymers have a critical shear rate at onset of surface melt fracture of at least 50 percent greater than the critical shear rate at the onset of surface melt fracture of a linear olefin polymer having about the same I2 and Mw/Mn.

The preferred melt index, measured as $_2$ (ASTM D-1238, condition 190/2.16 (formerly condition E)), is from about 0.5 g/10 min to 20 g/10 min, more preferably 1 to 5 g/10 min. Typically, the preferred substantially linear ethylene polymers used in the practice of this invention are homogeneously branched and do not have any measurable high density fraction, i.e. short chain branching distribution as measured by Temperature Rising Elution Fractionation which is described in U.S. Pat. No. 5,089,321 the disclosure of which is incorporated herein by reference or stated in another manner, these polymers do not contain a polymer fraction that has a degree of branching less than or equal to 2 methyls/1000 carbons. These preferred substantially linear ethylene polymers also consist of a single differential scanning calorimetry (DSC) melting peak.

Any unsaturated organic compound containing at least one ethylenic unsaturation (e.g. at least one double bond), and at least one carbonyl group (—C=O) that will grafted be to polypropylene or a substantially linear ethylene polymer as described above can be used in the practice of this invention. Representative unsaturated organic compounds that contain at least one carbonyl group are the ethylenically unsaturated carboxylic acids, anhydrides, esters and their salts, both metallic and nonmetallic. Preferably, the organic compound contains ethylenic unsaturation conjugated with the carbonyl group. Representative compounds include maleic, fumaric, acrylic, methacrylic, itaconic, crotonic, α-methyl crotonic, cinnamic, and the like, acids and their anhydride, ester and salt derivatives, if any. Maleic anhydride is the preferred unsaturated organic compound containing at least one ethylenic unsaturation and at least one carbonyl group.

The unsaturated organic compound content of the grafted polypropylene or substantially linear ethylene polymer is at least about 0.01 wt %, preferably at least about 0.1 wt %, and more preferably at least about 0.5 wt %, based on the combined weight of the polymer and the organic compound. The maximum amount of unsaturated organic compound content can vary to convenience, but typically it does not exceed about 10 wt %, preferably it does not exceed about 5 wt %, and more preferably it does not exceed about 2 wt %.

The unsaturated organic compound can be grafted to the polypropylene or substantially linear ethylene polymer by any known technique, such as those taught in U.S. Pat. No. 3,236,917 and U.S. Pat. No. 5,194,509 both of which are incorporated herein by reference. For example, in the '917 patent the polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. In the '509 patent, the procedure is similar except that the reaction temperature is higher, e.g. 210° to 300° C., and a free radical initiator is not used.

An alternative and preferred method of grafting is taught in U.S. Pat. No. 4,950,541, the disclosure of which is also incorporated herein by reference, by using a twin-screw devolatilizing extruder as the mixing apparatus. The polypropylene or substantially linear ethylene polymer and unsaturated organic compound are mixed and reacted within the extruder at temperatures at which the reactants are molten and in the presence of a free radical initiator. Preferably, the unsaturated organic compound is injected into a zone maintained under pressure within the extruder.

Representative of the interpolymers (which include copolymers and terpolymers) of ethylene and an $\alpha,\beta$-unsaturated carbonyl comonomer are copolymers of ethylene and acrylic acid or methacrylic acid (EAA or EMAA) and their ionomers (e.g. their metal salts), ethylene and vinyl acetate (EVA) and its derivative ethylene vinyl alcohol (EVOH), ethylene and carbon monoxide (ECO), ethylene/propylene and carbon monoxide (EPCO), ethylene/carbon monoxide/acrylic acid terpolymer (ECOAA), and the like. With respect to EAA and EMAA (and their derivatives), these materials are usually produced by the free radical copolymerization of ethylene with acrylic acid or methacrylic acid. The resulting copolymers have carboxylic acid groups along the backbone and/or side chains of the copolymer which in the case of their ionomers, can be subsequently neutralized or partially neutralized with a base. Preferably, these copolymers contain between about 3 and 20, more preferably between about 5 and 15, and most preferably between about 8 and 12 percent by weight of acrylic acid or methacrylic acid monomer units in the polymer chain. The melt index of these copolymers is in the range of about 0.5 to 1500, preferably in the range of about 5 to about 300.

With respect to ECO and EPCO polymers, the classes of materials described in U.S. Pat. No. 4,916,208 to Klingensmith, the disclosure of which is incorporated herein by reference, are illustrative of the classes of ECO and EPCO polymers that can be used in the practice of this invention. Such polymers can be linear altenating copolymers or random copolymers.

Preferably, the polypropylene or graft-modified polypropylene comprises between about 40 and 60 wt %, more preferably between 45 and 55 wt %, of the paintable thermoplastic composition. Preferably, this component of the composition is at least 50 wt %, based on the weight of this component, graft-modified polypropylene, more preferably at least 75 wt % graft-modified polypropylene. Most preferably, this component of the composition is 100 percent graft-modified polypropylene.

Preferably the substantially linear ethylene polymer component of the composition is between about 10 and 30 wt more preferably between about 15 and 25 wt %, of the composition. Like the polypropylene component, the respective amounts of substantially linear ethylene polymer and graft-modified substantially linear ethylene polymer can vary to convenience although a preponderance (i.e. greater than 50 wt %) of nongrafted substantially linear ethylene polymer is preferred. The more preferred composition of this component is at least 75 percent, on a weight basis, nongrafted substantially linear ethylene polymer, and a composition of 100 percent nongrafted substantially linear ethylene polymer is most preferred.

The preferred amount of the interpolymer of ethylene and an $\alpha,\beta$-unsaturated carbonyl is between about 10 and 40 wt %, more preferably between about 20 and 30 wt %, based on the weight of this component.

One preferred embodiment of this invention comprises a paintable, thermoplastic composition comprising, in wt % based upon the weight of the composition, about:

A. 40 to about 60 percent graft-modified polypropylene;

B. 10 to about 30 percent nongrafted substantially linear ethylene polymer; and

C. 10 to about 40 percent interpolymer of ethylene and an $\alpha,\beta$-unsaturated carbonyl comonomer, preferably one or more of EAA, EMAA, EVA, ECO, EPCO and ECOAA;

with the proviso that the sum of Components B and C is between about 40 and 60 wt % of the composition.

Another preferred embodiment of this invention is a paintable thermoplastic composition comprising, in wt % based upon the weight of the composition, about:

A. 45 to about 55 percent of graft-modified polypropylene;

B. 15 to about 25 percent nongrafted substantially linear ethylene polymer; and

C. 20 to about 30 percent of interpolymer of ethylene and an $\alpha,\beta$-unsaturated carbonyl comonomer, preferably one or more of EAA, EMAA, EVA, ECO, EPCO and ECOAA;

with the proviso that the sum of Components B and C is between about 45 and about 55 wt % of the composition.

The components of the composition of this invention are mixed with one another in any conventional manner that insures the creation of a relatively homogenous blend. If the blend is molded into a finished article by extrusion, the individual components are typically introduced into the extruder separately and mixed within it prior to extrusion. If the blend is molded by a compression or injection technique, then the three components are first well mixed by any conventional means, e.g., roller mill, agitator, etc., and then introduced as a homogenous mass into the mold.

In another embodiment of this invention, the graft-modified polypropylene or substantially linear ethylene polymer is "let down" or diluted with virgin (i.e. nongrafted) polypropylene or substantially linear ethylene polymer prior to its use as a blend component. For example, after the graft-modified substantially linear ethylene polymer has been prepared as described in U.S. Pat. No. 4,950,541, it is then back-blended in an extruder with virgin substantially linear ethylene polymer to a predetermined dilution. Let down or dilution ratios will vary with the ultimate application of the thermoplastic composition, but weight ratios between 1:10 and 10:1 are typical.

The paintable thermoplastic compositions of this invention exhibit several desirable properties. First, these compositions are paintable with conventional paints without prior application of a primer or prior surface treatment of the molded article.

Second, these materials demonstrate excellent heat resistance which is an important corollary property to paintability. In commercial applications, such as molded automobile parts, paints are often cured in an oven at temperatures in excess of 200° F. The molded article must not only demonstrate good adhesion to the paint, but it must also demonstrate good resistance to the cure temperature.

Third, molded articles made from the compositions of this invention demonstrate good low temperature impact resistance. Again, this is an important property in certain commercial applications, such as molded, exterior automobile parts.

Fourth, the recyclability of fabricated articles made from the compositions of this invention is enhanced relative to the recyclability of fabricated articles made from similar but conventional compositions. Recycled articles, e.g. automobile fascia, are ground into relatively small particles, and then blended with virgin polymer. With conventional compositions, the paint attaches to the article through the action of a primer or surface pretreatment but under the conditions of recycling, this surface treatment is lost and the components separate. Once separated, compatibility is lost (due to the polar nature of the paint and the nonpolar nature of the polymer) and the integrity of the recycle melt (i.e. paint, primer (perhaps), recycled polymer and virgin polymer), and any articles made from the melt, is degraded.

With the compositions of this invention, however, the paint and polymer are compatible (both are polar in nature) and as such, the conditions of recycling are not detrimental to the integrity of the recycle melt or the articles made from the melt. In other words, the compositions of this invention have compatibility with respect to both the surface and bulk matrix of the polymer formulation, while the conventional compositions have compatibility with the surface but not the bulk matrix of the polymer formulations. This compatibility characteristic is particularly useful in the recycling of painted automobile fascia fabricated from compositions comprising graft-modified substantially linear polymers and polypropylene-based TPO.

The fabricated articles of this invention can be prepared by known thermoplastic fabrication methods, and particularly by known thermoplastic molding methods, such as injection, compression, blow, rotational, reaction injection and molding techniques. Also, the fabricated articles of this invention can be painted by known coating methods, including spray paint applications and in-mold coating techniques.

The following examples are illustrative of certain specific embodiments of this inventions. All parts and percentages are by weight unless otherwise noted.

SPECIFIC EMBODIMENTS

Sample Preparation
The following materials are used in the preparation of the test samples:

| Material | Description |
| --- | --- |
| Polypropylene | Profax ® 6524 manufactured and sold by Himont. Melt flow rate (MFR) = 4 g/10 min. Density = 0.9 g/cm³. |
| Graft-modified Polypropylene | Admer ® QF 500A manufactured and sold by Mitsui. Polypropylene-based polymer grafted with 1.5 wt % maleic anhydride. MFR = 3.0 g/10 min. Density = 0.90 g/cm³. |
| Graft-modified The substantially linear ethylene Polymer | Polyolefin elastomer made by Dow Chemical Company and grafted with 1.3 wt % maleic anhydride. The graft- |

-continued

Sample Preparation
The following materials are used in the preparation of the test samples:

| Material | Description |
| --- | --- |
| EAA | modified product has an MI = 0.25 g/10 min. and a density = 0.870 Primacor ® 3460, an interpolymer of ethylene and acrylic acid sold by The Dow Chemical Company containing 9.7 wt % polymerized acrylic acid. MI = 20 g/10 min. |

The graft-modified substantially linear ethylene polymer is grafted with maleic anhydride (MAH) according to the procedures described in U.S. Pat. No. 4,950,541. The graft-modified polymer contains 1.3 wt %, based on the weight of the polymer, of grafted MAH.

The polymers are dry-mixed at certain indicated weight ratios, and the dry mix is then fed into a Werner-Pfleiderer ZSK-30 twin-screw extruder operated at about 200° C. The blends are made in one extrusion pass.

Injection molded samples are prepared using a 50 ton Negri-Bossi Injection Molder operated with a barrel temperature between about 200° and 250° C., a barrel pressure of 40 bars, cooling mold temperature of 30° C. and a residence time in the cooling mold of about 12 seconds. The samples are formed into 2.5"×6.5"×0.075" plaques. Table 1 describes the composition of eight different plaques.

TABLE 1
Composition of Test Plaques

| Sample | Graft-Modified Polypropylene | Poly-propylene | Graft-Modified Substantially Linear Ethylene Polymer | EAA |
| --- | --- | --- | --- | --- |
| C-1 | 100 | — | — | — |
| C-2 | — | — | 100 | — |
| C-3 | — | — | — | 100 |
| C-4 | — | — | 50 | 50 |
| C-5 | 50 | — | 50 | — |
| C-6 | — | 50 | 20 | 30 |
| 1 | 50 | — | — | 50 |
| 2 | 50 | — | 20 | 30 |

Paint Adhesion Tests

The plaques are washed and then one coat of automotive paint is applied to each. The paint, a heat-cured melamine formaldehyde cross-linked polyurethane or polyester, is baked (cured) at 250° F. (121° C.). Each plaque is given a single base coat (no primer), and is then baked for 40 minutes.

On the fourth day after curing, the paint strength is at or near maximum. Initial paint adhesion is determined using the crosshatch and tape peel test of ASTM D-3359-87. If these tests are successfully passed, then the samples are placed in a humidity chamber for 96 hours according to GM-4465-P. After removal from the chamber, the paint adhesion is again determined using the crosshatch and tape peel test, and then the dime scrape test according to GM-9506-P. The results are reported in Table 2.

TABLE 2

| Sample | Paintability Tests | | |
|---|---|---|---|
| | Initial Adhesion | Adhesion After 96 hr. in Humidity Chamber | Dime Scrape After 96 hr. in Humidity Chamber |
| C-1 | Fail | — | — |
| C-2 | Pass* | Pass | Pass |
| C-3 | Pass* | — | — |
| C-4 | Pass* | Pass | Pass |
| C-5 | Pass | Fail | Fail |
| C-6 | Fail | — | — |
| 1 | Pass | Pass | Pass |
| 2 | Pass | Pass | Pass |

*The testing sample shriveled after baking in the 250 F. oven for 40 minutes.

Sample C-1 demonstrates that graft-modified polypropylene by itself is not paintable. Samples C-2, C-3 and C-4 are paintable, but these low density materials shriveled after 40 minutes in an oven at 250° F. (121° C.). Sample 1 combines the excellent heat resistance of graft-modified polypropylene and the paintability of EAA. Sample C-5 demonstrates that a one-to-one blend of graft-modified polypropylene and graft-modified substantially linear ethylene polymer has good initial paint adhesion, but the adhesion will fail after 96 hours in a humidity chamber. Sample 2 shows that a blend of graft-modified polypropylene with graft-modified substantially linear ethylene polymer and EAA retains the initial paintability even after 96 hours in a humidity chamber. Sample C-6 demonstrates, however, that a blend of nongrafted polypropylene with graft-modified substantially linear ethylene polymer and EAA is not paintable.

To obtain the necessary thermal resistance to withstand the heat of a paint curing oven, the addition of a blend of a graft-modified and nongrafted polypropylene is beneficial. Moreover, blending graft-modified polypropylene with a blend of EAA and graft-modified substantially linear ethylene polymer demonstrates dramatically better paintability than the blending of nongrafted polypropylene with a blend of EAA and graft-modified substantially linear ethylene polymer.

Impact Properties

In addition to the properties of heat resistance and paintability, the property of impact resistance is also important in many applications. Table 3 reports the measured IZOD impact properties at room temperature and at −30° C.

TABLE 3

| Sample | Impact Properties and Flex Modulus | | |
|---|---|---|---|
| | Flex Modulus (kpsi) | IZOD at Room Temperature (ft-lb/in) | IZOD at −30 C. (ft-lb/in) |
| C-1 | 135 | 8.3 | 0.55 |
| C-4 | 8 | 3.51 | 1.07 |
| C-5 | 39 | 6.2 | 12.1 |
| C-6 | 70 | 9.09 | 0.84 |
| 1 | — | 2.76 | 0.52 |
| 2 | 56 | 6.55 | 5.82 |

Among the test samples, Sample 2 demonstrates a superior balance of low temperature impact resistance with excellent paintability and heat resistance.

Although the invention has been described in detail by the preceding examples, such detail is for the purpose of illustration only, and it is not to be construed as a limitation upon the invention. Many variations can be made upon the preceding examples without departing from the spirit and scope of the following claims.

What is claimed is:

1. A paintable olefinic composition comprising, in weight percent based upon the total weight of the composition:
  A. about 30 to about 70 percent graft-modified polypropylene or a blend of polypropylene and graft-modified polypropylene;
  B. a nongrafted substantially linear ethylene polymer or a graft-modified substantially linear polymer or a blend of nongrafted substantially linear ethylene polymer and graft-modified substantially linear polymer, present in an amount from greater than 0 to about 40 percent; and
  C. an interpolymer of ethylene and an $\alpha,\beta$-unsaturated carbonyl comonomer or an interpolymer of ethylene and carbon monoxide comonomer, the interpolymer present in an amount from greater than 0 up to about 50 percent;

with provisos that:
  (i) the sum of components B and C is between about 30 and about 70 wt. % of the composition; and
  (ii) the substantially linear ethylene polymer is characterized as having
    (a) a melt flow ratio defined by the equation:

$$I_{10}/I_2 \geq 5.63$$

(b) a molecular weight distribution defined by the equation:

$$M_w/M_n \leq (I_{10}/I_2) - 4.63$$

(c) a density greater than about 0.850 g/cm³, and
    (d) a critical shear rate at onset of surface melt fracture of at least 50 percent greater than the critical shear rate at the onset of surface melt fracture of a linear olefin polymer having about the same $I_2$ and $M_w/M_n$.

2. The composition of claim 1 in which component (A) is a blend of polypropylene and graft-modified polypropylene.

3. The composition of claim 2 in which component (A) comprises at least about 50 wt % of graft-modified polypropylene.

4. The composition of claim 3 in which component (B) is between about 10 and 30 wt % of the composition.

5. The composition of claim 4 in which component (B) comprises at least about 50 wt % of the nongrafted substantially linear ethylene polymer.

6. The composition of claim 5 in which the density of the nongrafted substantially linear ethylene polymer is between about 0.850 to about 0.920 g/cm³.

7. The composition of claim 6 in which component (C) comprises between about 10 and 40 wt % of the composition.

8. The composition of claim 7 in which component (C) is selected from the group consisting of ethylene/acrylic acid copolymer, ethylene/methacrylic acid copolymer, ethylene/vinyl acetate copolymer, ethylene/carbon monoxide copolymer, ethylene/propylene/carbon monoxide terpolymer, ethylene/carbon monoxide/acrylic acid terpolymer, and mixtures thereof.

9. The composition of claim 1 in which the graft-modified polypropylene is graft-modified with at least about 0.01 wt %, based on the weight of the polypropylene, of maleic anhydride.

10. The composition of claim 1 in which the graft-modified substantially linear ethylene polymer is graft-modified with at least about 0.01 wt %, based on the weight of the polymer, of maleic anhydride.

11. The composition of claim 8 in which component (C) is an ethylene/acrylic acid copolymer.

12. The composition of claim 11 in which the ethylene/acrylic acid copolymer contains about 3 to about 20 wt %, based on the weight of the copolymer, acrylic acid monomer units.

13. The composition of claim 1 in which component (C) is at least one of an ethylene/carbon monoxide copolymer and an ethylene/propylene/carbon monoxide terpolymer.

14. A fabricated article made from the composition of claim 1.

15. The fabricated article of claim 14 made by extrusion.

16. The fabricated article of claim 14 made by injection molding.

17. The fabricated article of claim 14 made by compression molding.

18. A painted fabricated article made from the composition of claim 1.

19. The painted article of claim 18 made by injection molding.

20. The painted article of claim 18 made by compression molding.

21. A paintable olefinic composition consisting essentially of, in weight percent based upon the total weight of the composition about:
   A. 40 to about 60 percent graft-modified polypropylene;
   B. 10 to about 30 percent nongrafted substantially linear ethylene polymer; and
   C. 10 to about 40 percent ethylene/acrylic acid copolymer;
with the provisos that:
   (i) the sum of components B and C is between about 40 and 60 wt % of the composition; and
   (ii) the substantially linear ethylene polymer is characterized as having:
      (a) a melt flow ratio defined by the equation:

$$I_{10}/I_2 \geqq 5.63;$$

(b) a molecular weight distribution defined by the equation:

$$M_w/M_n \leqq (I_{10}/I_2) - 4.63;$$

(c) a density greater than about 0.850 g/cm$^3$; and
      (d) a critical shear rate at onset of surface melt fracture of at least 50 percent greater than the critical shear rate at the onset of surface melt fracture of a linear olefin polymer having about the same $I_2$ and $M_w/M_n$.

* * * * *